United States Patent
Li et al.

(10) Patent No.: US 12,286,932 B1
(45) Date of Patent: Apr. 29, 2025

(54) TURBINE ENGINE COMBUSTOR INCLUDING A HEAT SHIELD

(71) Applicant: General Electric Company, Schenectady, NY (US)

(72) Inventors: Hejie Li, Mason, OH (US); Hiranya Nath, Bengaluru (IN); Habeeb Kunnummal Manat, Bengaluru (IN); Shai Birmaher, Cincinnati, OH (US); Craig Alan Gonyou, Blanchester, OH (US); Anquan Wang, Mason, OH (US); Michael A. Benjamin, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/441,736

(22) Filed: Feb. 14, 2024

(51) Int. Cl.
  *F02C 7/24* (2006.01)
  *F02C 7/12* (2006.01)
  *F23R 3/28* (2006.01)

(52) U.S. Cl.
  CPC ............... *F02C 7/24* (2013.01); *F02C 7/12* (2013.01); *F23R 3/286* (2013.01); *F05D 2240/35* (2013.01); *F05D 2260/231* (2013.01)

(58) Field of Classification Search
  CPC ........................................................ F02C 7/14
  See application file for complete search history.

(56) References Cited

U.S. PATENT DOCUMENTS

| | | | |
|---|---|---|---|
| 4,180,974 A * | 1/1980 | Stenger | F23R 3/14 60/756 |
| 7,762,070 B2 | 7/2010 | Dawson et al. | |
| 8,171,735 B2 | 5/2012 | Mancini et al. | |
| 8,336,313 B2 | 12/2012 | McMasters et al. | |
| 8,387,391 B2 | 3/2013 | Patel et al. | |
| 11,725,818 B2 | 8/2023 | Snyder | |
| 2007/0289305 A1 * | 12/2007 | Oda | F23R 3/286 60/748 |
| 2009/0255260 A1 | 10/2009 | McMasters et al. | |
| 2010/0285415 A1 | 11/2010 | Böttcher et al. | |
| 2020/0025384 A1 * | 1/2020 | Patel | F23R 3/002 |
| 2022/0372913 A1 * | 11/2022 | Nath | F23R 3/283 |
| 2022/0373182 A1 | 11/2022 | Nath et al. | |

FOREIGN PATENT DOCUMENTS

GB  2471232 A  12/2010

* cited by examiner

*Primary Examiner* — David P. Olynick
(74) *Attorney, Agent, or Firm* — Venable LLP; Griffin A. A. Deadwick; Michele V. Frank

(57) ABSTRACT

A combustor of a turbine engine has a combustion chamber for combusting fuel and air, generating heat. A fuel nozzle-mixer assembly mixes and injects fuel and air into the combustion chamber for combustion. The assembly has a heat shield at an aft end for shielding the assembly from the heat. A centerbody outer shell defines a cooling air flow cavity. A cooling air flow gap is defined between the centerbody outer shell and the heat shield. The centerbody outer shell has cooling air exit holes between the cooling air flow cavity and the cooling air flow gap, the air passing through the cooling air exit holes and into the cooling air flow gap. The cooling air exits the cooling air flow gap at a cooling air exit angle, the cooling air exit angle having a non-zero axially aft component, displacing the combustion downstream, to protect the assembly.

19 Claims, 6 Drawing Sheets

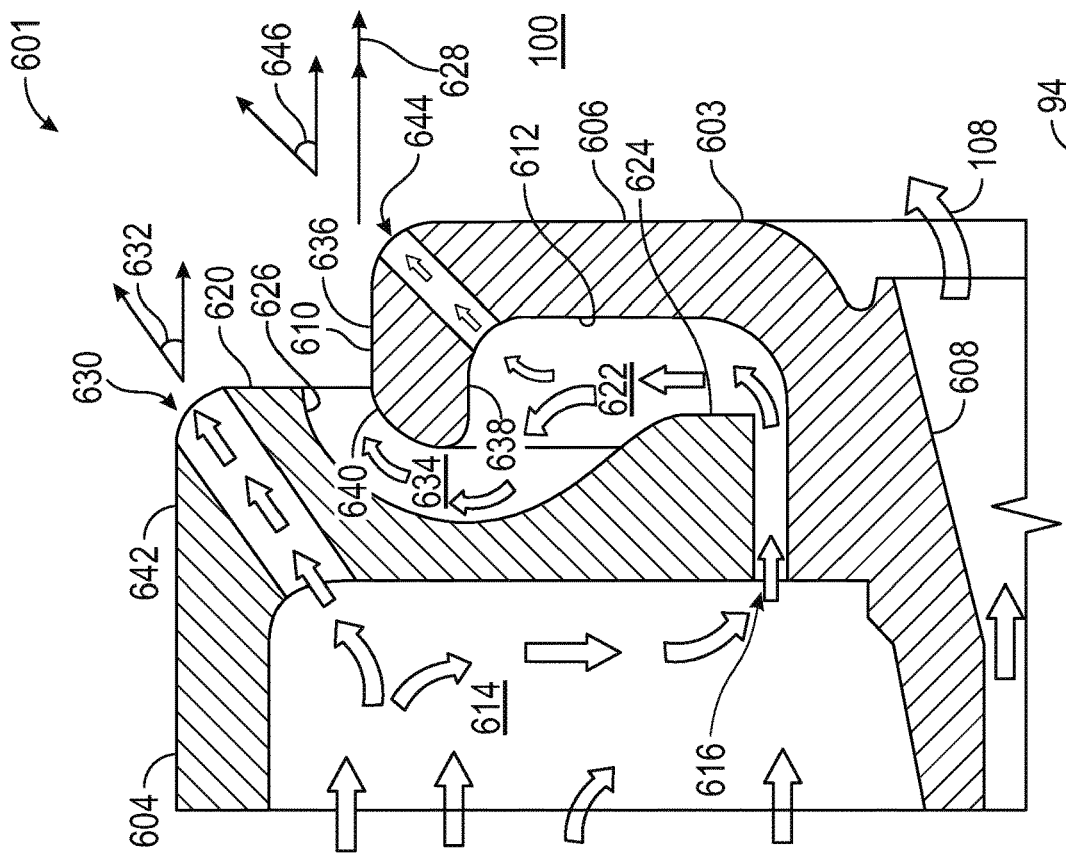
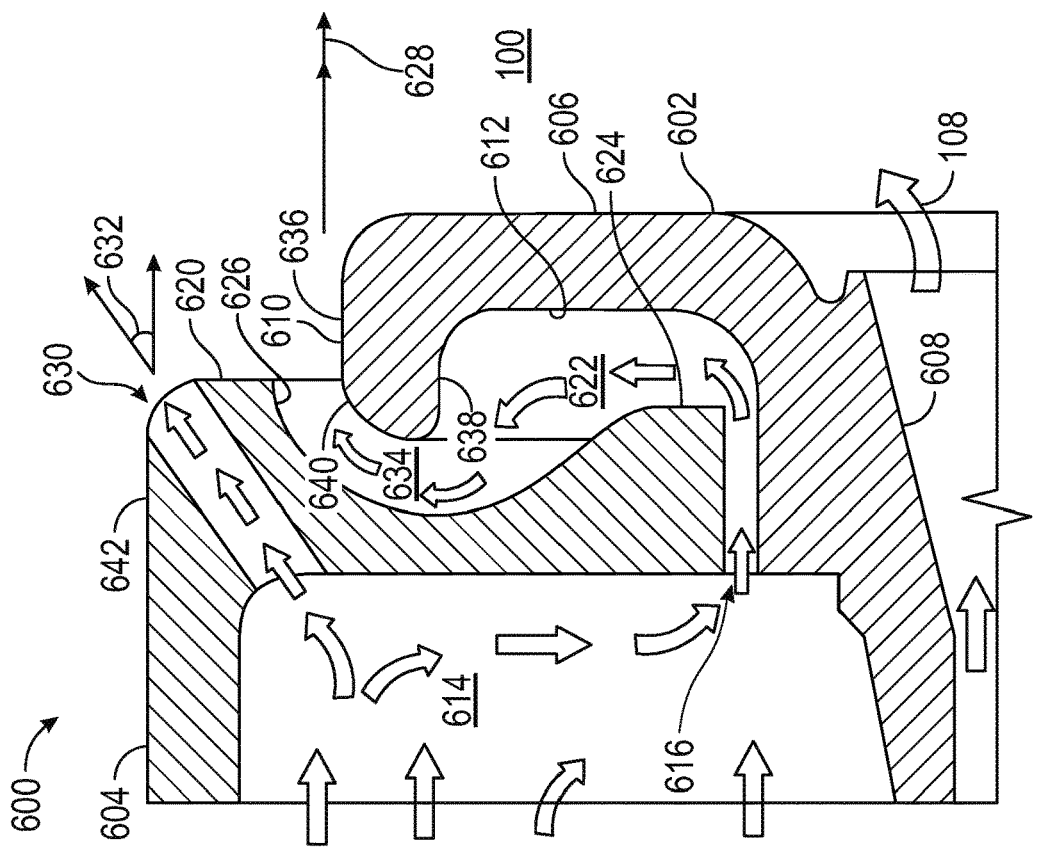
FIG. 6A
FIG. 6B

TURBINE ENGINE COMBUSTOR INCLUDING A HEAT SHIELD

TECHNICAL FIELD

The present disclosure relates generally to a turbine engine combustor including a heat shield.

BACKGROUND

Turbine engines, for example, for aircraft, generally include a fan and a turbo-engine arranged in flow communication with one another. Within the core section, a combustor includes one or more fuel nozzle-mixer assemblies arranged at an upstream end, for the purpose of introducing and mixing fuel and air for combustion in a combustion chamber. The fuel nozzle-mixer assembly is protected from the heat of the combustion by a heat shield on the downstream end of the fuel nozzle-mixer assembly. The fuel nozzle-mixer assembly is thermally protected in part by routing cooling air in a downstream direction, displacing the combustion process and the heat produced, downstream from the fuel nozzle-mixer assembly.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 6A is a schematic cross-sectional view of a portion of a fuel nozzle-mixer assembly, taken along a combustor longitudinal centerline axis, according to the present disclosure.

FIG. 6B is a schematic cross-sectional view of a portion of a fuel nozzle-mixer assembly, taken along a combustor longitudinal centerline axis, according to the present disclosure.

DETAILED DESCRIPTION

Figure 1:
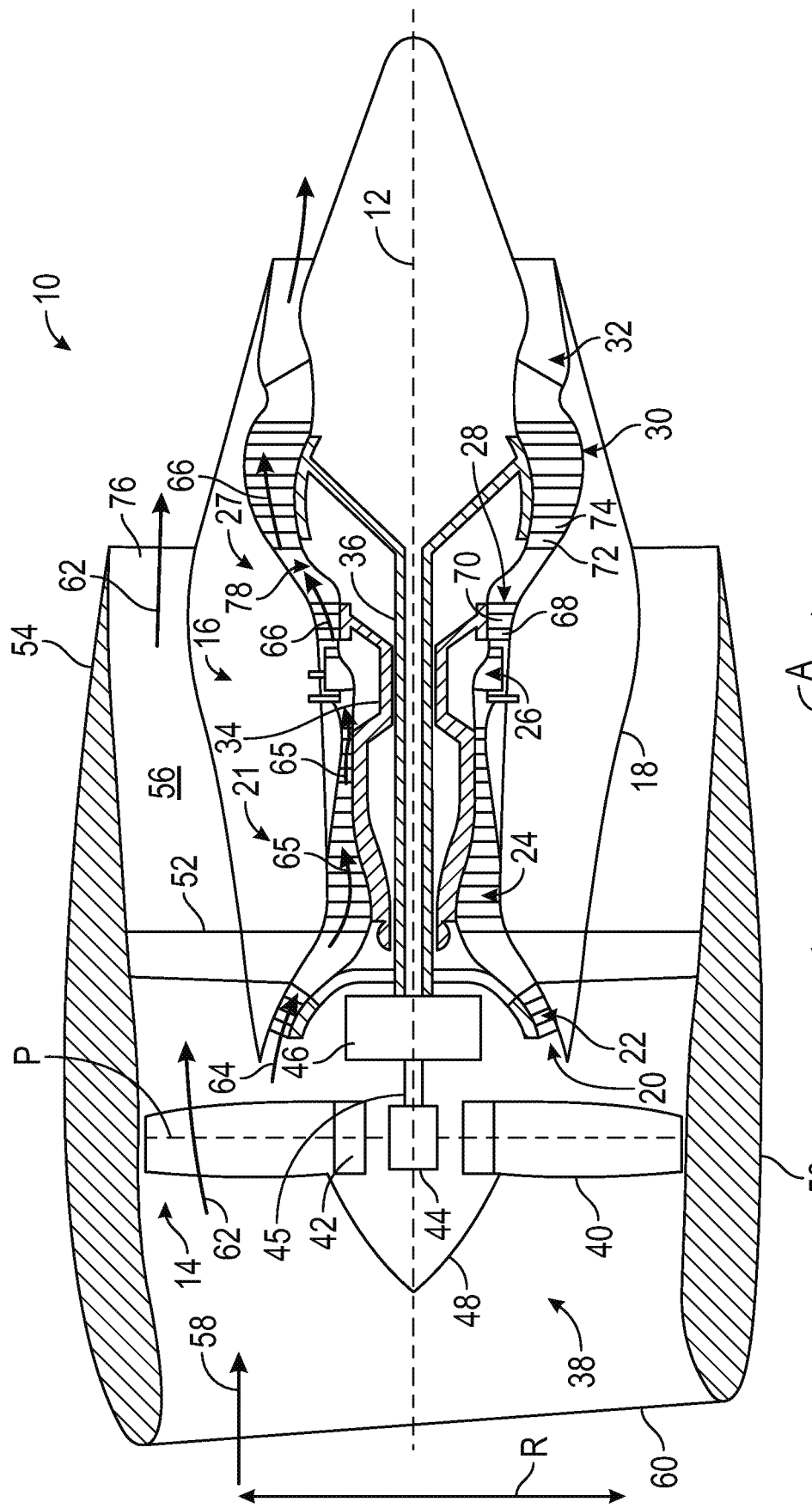
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," and "second," may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbine engine includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb.

The terms "coupled," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

As used herein, the terms "air" and "oxidizer" are used interchangeably in the context of mixing together for combustion.

As used herein, an angle of flow "having a non-zero axially aft component" refers to flow at least partially in the axially aft direction, with respect to the combustor longitudinal centerline axis, inclusive of flow substantially parallel to the combustor longitudinal centerline axis. An angle of flow "having a non-zero radially outward component" refers to flow at least partially in the radially outward direction, with respect to the combustor longitudinal centerline axis, inclusive of substantially radially outward flow, away from the combustor longitudinal centerline axis. Flow "having a non-zero radially outward component" is expressed as a positive angle relative to the combustor longitudinal centerline axis. An angle of flow "having a non-zero radially inward component" refers to flow at least partially in the radially inward direction, with respect to the combustor longitudinal centerline axis, inclusive of substantially radially inward flow, toward the combustor longitudinal centerline axis. Flow "having a non-zero radially inward component" is expressed as a negative angle relative to the combustor longitudinal centerline axis.

Combustors are known to include a fuel nozzle-mixer assembly that has a pilot swirler that includes a venturi. The pilot swirler ejects a fuel and air mixture into the venturi and then into a combustion chamber, wherein the fuel and air mixture is combusted. At the outlet end of the venturi, a heat shield is generally provided to protect the fuel nozzle-mixer assembly. The conventional heat shield includes a heat shield flange that is generally aligned perpendicular to the fuel nozzle centerline and the outer edge of the heat shield flange is a squared-off tip. As the fuel and air mixture exiting the venturi is burned, the flow path out of the venturi results in a hot zone at a heat shield aft surface. Cooling air, used for cooling the heat shield, is ducted through the fuel nozzle-mixer assembly, exiting through passages therein.

The present disclosure addresses the foregoing by providing a heat shield and a fuel nozzle center body with aft end geometries that further direct the cooling air in a more axial direction, thereby, reducing a hot zone gas temperature or biasing the hot zone toward the aft direction. According to the present disclosure, the heat shield flange may include a forward-facing rim or include angled heat shield bypass holes. Additionally or alternatively, the fuel nozzle center body may include one or more of additional center body rim bypass holes, a concave aft face, and a rim aft face with a bullnose shape. By biasing the hot zone farther aft within the combustor, the heat shield is exposed to less heat, thereby, providing better durability than a conventional heat shield by reducing the prospect of material degradation due to close proximity exposure to the heat from the hot zone, over time.

As used in the following description of FIG. 1, the terms "axial" and "axially" refer to directions and orientations that extend substantially parallel to a longitudinal centerline axis of the turbine engine. Moreover, the terms "radial" and "radially" refer to directions and orientations that extend substantially perpendicular to the longitudinal centerline axis of the turbine engine. In addition, as used herein, the terms "circumferential" and "circumferentially" refer to directions and orientations that extend arcuately about the longitudinal centerline axis of the turbine engine.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustor 26, and a turbine section 27. The turbo-engine 16 is substantially enclosed within an outer casing 18 that is substantially tubular and defines an annular inlet 20. As schematically shown in FIG. 1, the compressor section 21 includes a booster or a low pressure (LP) compressor 22 followed downstream by a high pressure (HP) compressor 24. The combustor 26 is downstream of the compressor section 21. The turbine section 27 is downstream of the combustor 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustor 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 are rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62 is routed into the bypass airflow passage 56, and a second portion of air, also referred to as core air 64, is routed into the upstream section of the core air flow path through the annular inlet 20 of the LP compressor 22. The ratio between the bypass air 62 and the core air 64 is commonly known as a bypass ratio. The pressure of the core air 64 is then increased, generating compressed air 65. The compressed air 65 is routed through the HP compressor 24 and into the combustor 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 includes a fuel system that provides fuel to the combustor 26. The fuel is mixed with the compressed air 65 from the HP compressor 24 and ignited in the combustor 26 to produce the combustion gases 66. The fuel system may include a fuel tank or a fuel supply for storing the fuel therein, a fuel supply line, and a fuel injector. The fuel is provided from the fuel tank, along the fuel supply line to the fuel injector, which introduces the fuel into the combustor 26. The fuel system may include one or more flow control devices or valves along the fuel supply line for controlling an amount of the fuel provided to the combustor 26. The fuel injector may be provided at a forward end of the combustor 26. Accordingly, fuel provided along the fuel supply line is provided at a forward end of the combustor 26.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

In the following description of FIGS. 2 to 6B, the terms "axial" and "axially" refer to directions and orientations that extend substantially parallel to a longitudinal centerline axis of the combustor. Moreover, the terms "radial" and "radially" refer to directions and orientations that extend substantially perpendicular to the longitudinal centerline axis of the combustor. In addition, as used herein, the terms "circumferential" and "circumferentially" refer to directions and orientations that extend arcuately about the longitudinal centerline axis of the combustor.

Figure 2:
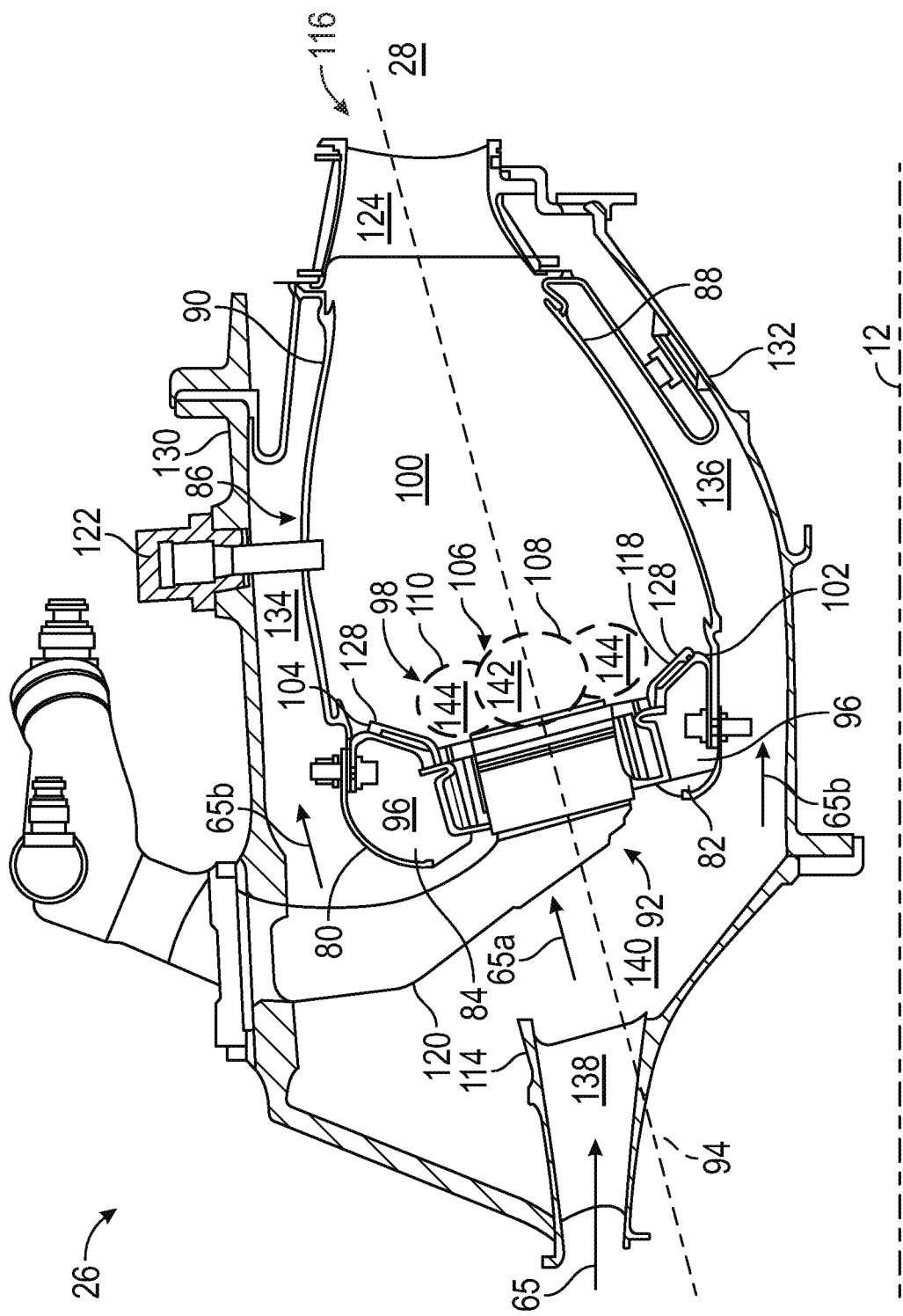
FIG. 2 is a schematic view of a combustor assembly, taken along a combustor longitudinal centerline axis, according to the present disclosure.

FIG. 2 is a cross-sectional side view of the exemplary combustor 26 of the turbo-engine 16 as shown in FIG. 1. FIG. 2 depicts an example of a twin annular pre-mixing swirler (TAPS) type combustor, and is generally an annular combustor that extends circumferentially about the longitudinal centerline axis 12. The combustor 26 includes a cowl 80, consisting of an inner cowl 82 and an outer cowl 84, and a combustor liner 86, having an inner liner 88 and an outer liner 90. Each of the inner liner 88 and the outer liner 90 is an annular liner that extends circumferentially about the longitudinal centerline axis 12. In this regard, an annular opening 92 formed between inner cowl 82 and outer cowl 84 enables compressed air 65a to enter the combustor 26 through a diffuse opening in a generally axial direction, as defined by the combustor longitudinal centerline axis 94. The compressed air 65a may enter into a first cavity 96 defined at least in part by an annular dome assembly 98. As will be discussed in more detail below, a portion of the compressed air 65 in the first cavity 96 may be used for combustion, while another portion may be used for cooling the combustor 26.

The dome assembly 98 extends between the inner liner 88 and the outer liner 90. The inner liner 88, the outer liner 90, and the dome assembly 98 together define a combustion chamber 100. More particularly, the combustor 26 includes an inner annular dome 102 attached to the forward end of the inner liner 88 and an outer annular dome 104 attached to the forward end of the outer liner 90. In the combustion chamber 100, an initial chemical reaction of an ignited pilot fuel-oxidizer mixture 108 injected into the combustion chamber 100 by a pilot swirler portion (to be described below) of a fuel nozzle-mixer assembly 106 connected to the dome assembly 98 may occur to generate combustion gases 66. In higher power operations of the combustor 26, a main fuel-oxidizer mixture 110 is also injected into the combustion chamber 100 by a main swirler portion (to be described below) of the fuel nozzle-mixer assembly 106 (shown in FIG. 3) to generate combustion gases 66. The combustion gases 66 then flow further downstream into the HP turbine 28 and the LP turbine 30 (FIG. 1) via a first stage turbine nozzle 124 at a downstream end 116 of the combustion chamber 100.

The combustor 26 further includes a plurality of fuel nozzle-mixer assemblies 106 spaced along a circumferential direction between the inner annular dome 102 and the outer annular dome 104. The fuel nozzle-mixer assembly 106 and the downstream end 116 of the combustion chamber 100 generally define the combustor longitudinal centerline axis 94. A plurality of contoured cups 118, circumferentially-spaced about the longitudinal centerline axis 12, may be formed in the annular dome assembly 98, and each cup 118 defines an opening in which a swirler, a cyclone, or a fuel nozzle-mixer assembly 106 is mounted, attached, or otherwise integrated for introducing the air/fuel mixture into the combustion chamber 100. Notably, compressed air may be directed from the combustor 26 into or through one or more of the fuel nozzle-mixer assemblies 106 to support combustion in the upstream end of the combustion chamber 100.

A liquid and/or a gaseous fuel is transported to the combustor 26 by a fuel distribution system (not shown), and introduced at the front end of the combustion chamber 100. In an exemplary embodiment, each fuel nozzle-mixer assembly 106 may define an opening for receiving a fuel injector 120 (details are omitted for clarity). The fuel injector 120 may inject fuel in an axial direction (i.e., along combustor longitudinal centerline axis 94) as well as in a generally radial direction (orthogonally to combustor longitudinal centerline axis 94), where the fuel may be swirled with the incoming compressed air. Thus, each fuel nozzle-mixer assembly 106 receives compressed air from annular opening 92 and fuel from a corresponding fuel injector 120. The fuel and compressed air are swirled and mixed together by fuel nozzle-mixer assemblies 106, and the resulting fuel and air mixture is discharged into combustion chamber 100 for combustion thereof.

The combustor 26 may further comprise an ignitor 122 extending through the outer liner 90 suitable for igniting the fuel-air mixture. Upon ignition, the resulting combustion gases 66 may flow in a generally axial direction (along combustor longitudinal centerline axis 94) through the combustion chamber 100 into and through the turbine section of the engine 10 where a portion of thermal and/or kinetic energy from the combustion gases 66 is extracted via sequential stages of turbine stator vanes and turbine rotor blades. More specifically, the combustion gases 66 may flow into an annular, first stage turbine nozzle 124. As is generally understood, the first stage turbine nozzle 124 may be defined by an annular flow channel that includes a plurality of radially-extending, circularly-spaced nozzle vanes (not shown) that turn the gases so that they flow angularly and impinge upon the first stage turbine blades (not shown) of the HP turbine 28 (FIG. 1).

Each dome assembly 98 has a heat shield, for example, a deflector assembly 128, which thermally insulates the annular dome assembly 98 from the extremely high temperatures generated in the combustion chamber 100 during engine operation. The inner annular dome 102, the outer annular dome 104, and the deflector assembly 128 may define a plurality of openings (e.g., the cups 118) for receiving the fuel nozzle-mixer assemblies 106. As shown the plurality of openings are, in one embodiment, circular. In other embodiments, however, the openings may be ovular, elliptical, polygonal, oblong, or other non-circular cross sections.

The combustor 26 further includes an outer casing 130 that extends circumferentially about the longitudinal centerline axis 12, and an inner casing 132 that also extends circumferentially about the longitudinal centerline axis 12. An outer flow passage 134 is defined between the outer casing 130 and the outer liner 90, and an inner flow passage 136 is defined between the inner casing 132 and the inner liner 88. The outer casing 130 and the inner casing 132 converge at an upstream end 138 of the combustor 26, and together, define a pressure plenum 140. The outer casing 130 and the inner casing 132 are also connected with a diffuser 114. The diffuser 114 is in flow communication with the HP compressor 24 to receive a flow of compressed air 65 from the HP compressor 24 and to provide the flow of the compressed air 65 into the pressure plenum 140. The ignitor 122 may be connected to the outer casing 130, and extend through the outer flow passage 134 and through the outer liner 90. The ignitor 122 provides an ignition source (e.g., a spark) to ignite the pilot fuel-oxidizer mixture 108. The main fuel-oxidizer mixture 110 may be ignited via the ignited pilot fuel-oxidizer mixture 108, or the ignitor 122 may also be used to ignite the main fuel-oxidizer mixture 110.

Referring back to FIG. 1, in operation, a volume of inlet air 58 enters the nacelle 50 at a nacelle inlet 60, and the inlet air 58 is propelled by the fan 38 and passing therethrough. A portion of the inlet air 58 propelled by the fan 38 enters the LP compressor 22 as a flow of core air 64. The core air 64 is compressed by the LP compressor 22 to generate compressed air 65. The compressed air 65 then flows to the HP compressor 24, where the compressed air 65 is further compressed, increasing the pressure of the compressed air 65. The compressed air 65 from the HP compressor 24 enters the combustor 26 via the diffuser 114 (FIG. 2). Another portion of the inlet air 58 propelled by the fan 38 flows through the bypass airflow passage 56, thereby providing a flow of bypass air 62. The bypass air 62 provides a majority of the thrust for the turbine engine 10.

Referring back to FIG. 2, as discussed above, the compressed air 65 flows through the diffuser 114, which provides for a reduction in velocity of the compressed air 65 entering the pressure plenum 140. A portion of the compressed air 65 in the pressure plenum 140 enters the cowl 80 (shown schematically as air 65a), while another portion of the compressed air 65 passes to the outer flow passage 134 and to the inner flow passage 136 (shown schematically as a compressed flow of air 65b). The air 65a passes through the fuel nozzle-mixer assembly 106 to mix with fuel to generate the pilot fuel-oxidizer mixture 108 and the main fuel-oxidizer mixture 110, both of which are then ignited in a primary combustion zone 142 or a secondary combustion zone 144 to generate the combustion gases 66. The compressed flow of air 65b in the outer flow passage 134 and in the inner flow passage 136 may be used for various purposes, such as dilution air (not shown) provided to the combustion chamber 100 through dilution openings (not shown) in the inner liner 88 and the outer liner 90, for cooling of the inner liner 88 and the outer liner 90, or for cooling other components of the turbine engine 10.

Figure 3:
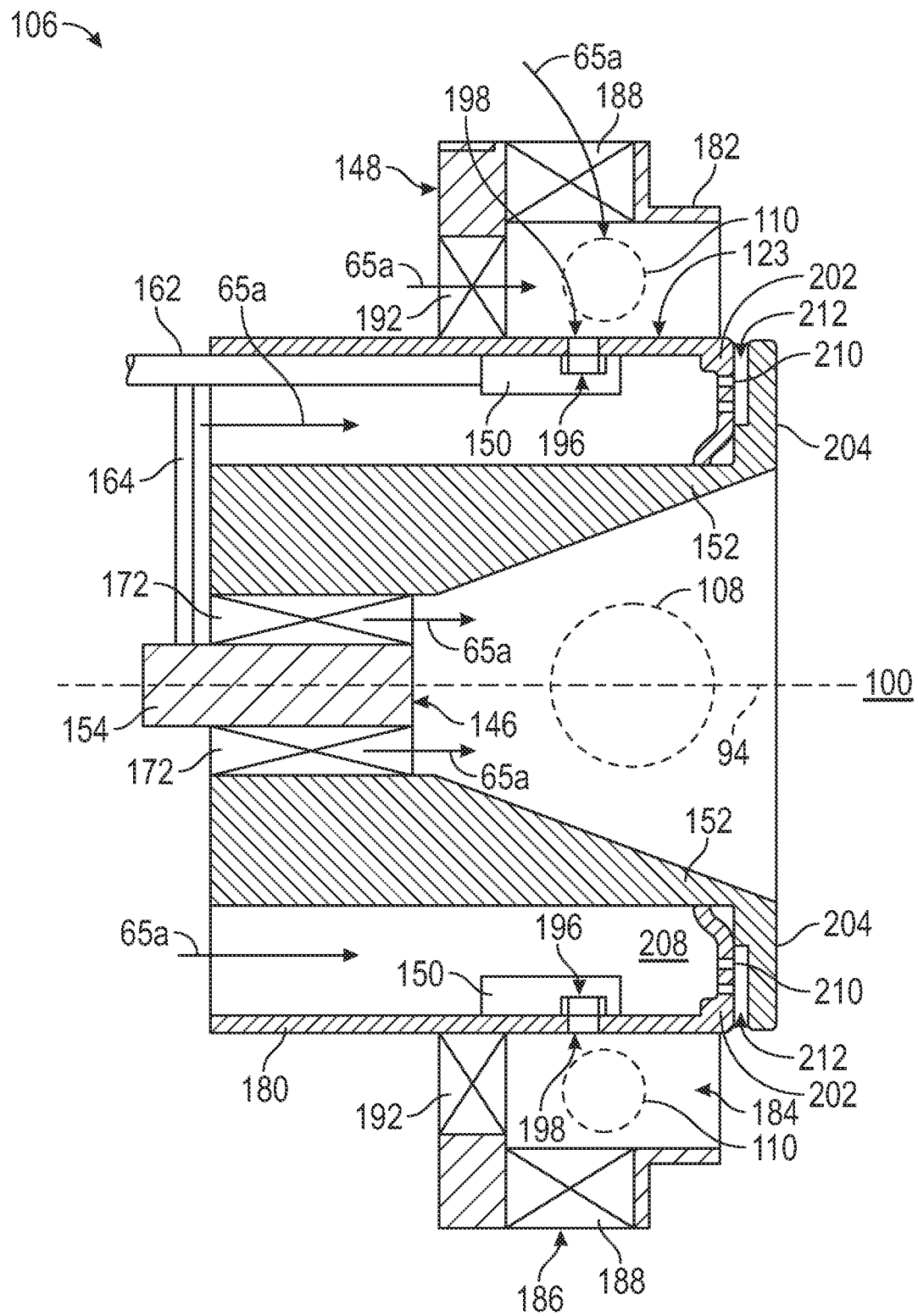
FIG. 3 is a schematic cross-sectional view of a portion of a fuel nozzle-mixer assembly, taken along a combustor longitudinal centerline axis, according to the present disclosure.

FIG. 3 is an enlarged partial cross-sectional view of the fuel nozzle-mixer assembly 106, according to the present disclosure. The fuel nozzle-mixer assembly 106 includes a pilot mixer 146, a main mixer 148, and a fuel manifold 150 positioned therebetween. The pilot mixer 146 includes an annular venturi 152 that extends circumferentially about the combustor longitudinal centerline axis 94, and a pilot fuel injector 154 mounted within the venturi 152. Further, the pilot mixer 146 includes a first pilot swirler 172 that constitutes a plurality of swirl vanes arranged radially outward of the pilot fuel injector 154. The first pilot swirler 172 is generally oriented parallel to the combustor longitudinal centerline axis 94, and includes a plurality of vanes for swirling air traveling therethrough. Fuel and air are generally provided to the pilot mixer 146 at all times during the engine operating cycle.

The pilot fuel injector 154 may perform pre-filming and atomization of fuel almost exclusively by blasting air at the fuel. Fuel is provided by a fuel tube 162 in flow communication with a fuel source (not shown) to a conduit 164 connected with the pilot fuel injector 154. The fuel is injected from the pilot fuel injector 154 into the venturi 152. The pilot fuel-oxidizer mixture 108 (FIG. 2) is then generated within the venturi 152 by mixing the swirling air 65a passing through the pilot mixer 146 and the fuel injected by the pilot fuel injector 154. The pilot fuel-oxidizer mixture 108 is then injected into the combustion chamber 100, where the pilot fuel-oxidizer mixture 108 is ignited and burned to generate the combustion gases 66.

The main mixer 148 is attached to a centerbody outer shell 180 that surrounds the pilot mixer 146. The main mixer 148 includes an annular main housing 182 radially surrounding the centerbody outer shell 180, where the main housing 182 defines an annular cavity 184 and a main swirler 186. The main swirler 186 includes a first swirler 188 that is oriented substantially radially to the combustor longitudinal centerline axis 94, and includes a plurality of vanes (the vanes shown generally) for swirling the compressed air 65a flowing therebetween. The vanes are substantially uniformly spaced circumferentially, and a plurality of substantially uniform passages are defined between adjacent vanes. The main swirler 186 also includes a second swirler 192 oriented substantially parallel to the combustor longitudinal centerline axis 94. The second swirler 192 further includes a plurality of vanes (the vanes shown generally) for swirling the compressed air 65a flowing therebetween. The vanes of the second swirler 192 are substantially uniformly spaced circumferentially, thereby defining a plurality of substantially uniform passages therebetween.

The fuel manifold 150, as stated above, is located between the pilot mixer 146 and the main mixer 148, and is in flow communication with a fuel supply (not shown). A plurality of main fuel injectors 196 are provided at the fuel manifold 150, and the centerbody outer shell 180 includes a plurality of main fuel injector orifices 198 therethrough. The main fuel injectors 196 are arranged to inject fuel through the main fuel injector orifices 198 and into the annular cavity 184 of the main mixer 148. As shown in FIG. 3, the main fuel injectors 196 are preferably positioned so that fuel is provided into the annular cavity 184 downstream of the first swirler 188 and downstream of the second swirler 192. The main fuel-oxidizer mixture 110 is generated within the annular cavity 184 by mixing of the compressed air 65a passing through the first swirler 188 and through the second swirler 192 with the fuel injected by the main fuel injectors 196 into the annular cavity 184. The main fuel-oxidizer mixture 110 then flows into the combustion chamber 100, where the main fuel-oxidizer mixture 110 is ignited and burned to generate the combustion gases 66.

Referring still to FIG. 3, the centerbody outer shell 180 includes a backplate 202 at a downstream end 123 of the centerbody outer shell 180. A heat shield 204 is integrally formed with the venturi 152, downstream of the backplate 202. The heat shield 204 thermally protects adjacent components of the fuel nozzle-mixer assembly 106 such as the centerbody outer shell 180 and the fuel manifold 150 from heat generated in the combustion chamber 100 and may be constructed from a ceramic matrix composite (CMC) or similar thermally insulating material.

The venturi 152, the centerbody outer shell 180, and the backplate 202 define a generally annular cooling air flow cavity 208. The air 65a flows through the cooling air flow cavity 208, and exits the cooling air flow cavity 208 through one or more cooling air exit holes 210 in the backplate 202. The cooling air exit holes 210 permit the air 65a to exit the cooling air flow cavity 208, thereby maintaining the air 65a in a continuous flow through the cooling air flow cavity 208. The air 65a exits the cooling air flow cavity 208, via the cooling air exit holes 210, first, into a cooling air flow gap 212 arranged circumferentially about the combustor longitudinal centerline axis 94, and axially between the backplate 202 and the heat shield 204. The air 65a flows through and exits the cooling air flow gap 212 in a generally radially outward direction, whereupon the air 65a merges with the flow of the main fuel-oxidizer mixture 110. The main fuel-oxidizer mixture 110, flowing in a generally axially downstream direction, lends a downstream component to the flow direction of the air 65a, after exiting the cooling air flow gap 212.

Figure 4A:
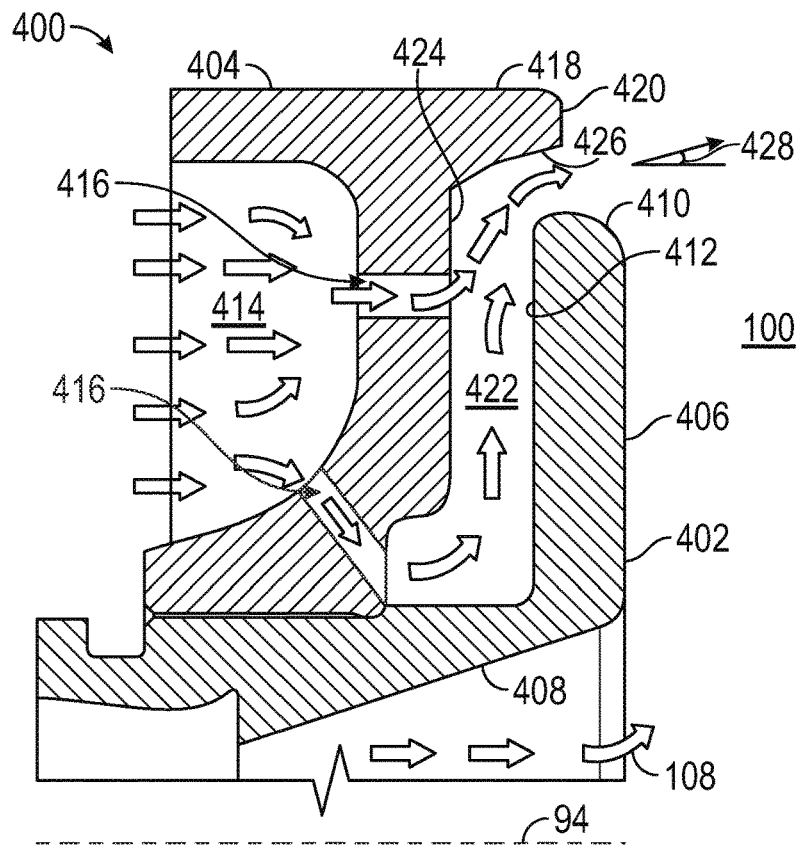
FIG. 4A is a schematic cross-sectional view of a portion of a fuel nozzle-mixer assembly, taken along a combustor longitudinal centerline axis, according to the present disclosure.

FIG. 4A shows an aft portion of a fuel nozzle-mixer assembly 400. The fuel nozzle-mixer assembly 400 includes a venturi body 402 and a centerbody outer shell 404. Upon exiting the fuel nozzle-mixer assembly 400, mixed fuel and air combust in the combustion chamber 100. The extremely high temperatures in the combustion chamber 100 necessitate the inclusion of a heat shield 406, in order to protect the various components of the fuel nozzle-mixer assembly 400, and the fuel contained therein, from heat generated in the combustion chamber 100.

The venturi body 402 includes a venturi 408 for providing a pilot fuel-oxidizer mixture 108, for pilot combustion, as described with respect to FIG. 3. The heat shield 406, for thermally protecting the fuel nozzle-mixer assembly, is formed as one piece with the venturi body 402, disposed at an aft end of the venturi body 402. A heat shield outer surface 410 is rounded, forming a "bullnose" shape, when viewed in cross section, as shown in FIG. 4A. The heat shield 406 has a forward face 412 arranged generally orthogonally to the combustor longitudinal centerline axis 94.

The centerbody outer shell 404 defines, in part, a cooling air flow cavity 414, and a circular array of cooling air exit holes 416 allowing throughflow of the air 65a. The cooling air exit holes 416 are arrayed circularly with respect to the combustor longitudinal centerline axis 94 and permit the air 65a to exit the cooling air flow cavity 414 flowing in a generally axially aft direction. The cooling air exit holes 416 may be sized and numbered to achieve a desirable volume and shape of the flow of the air 65a entering the combustion chamber 100 from the fuel nozzle-mixer assembly 400. The centerbody outer shell 404 also includes a centerbody rim 418, projecting from the centerbody outer shell 404 in an axially aft direction and arranged circumferentially about the combustor longitudinal centerline axis 94. The centerbody rim 418 of the centerbody outer shell 404, as shown in FIG. 4A, has a generally planar centerbody rim aft face 420, oriented generally orthogonally to the combustor longitudinal centerline axis 94.

The heat shield 406 and the centerbody outer shell 404 define a cooling air flow gap 422 therebetween. A centerbody aft face 424 is generally orthogonal to the combustor longitudinal centerline axis 94, and substantially parallel to the forward face 412 of the heat shield 406. Upon exiting through the cooling air exit holes 416, the air 65a flows in a radially outward direction at an upstream end of the cooling air flow gap 422, between the centerbody aft face 424 and the forward face 412.

At a downstream end of the cooling air flow gap 422, the cooling air flow gap 422 is defined by a centerbody rim inner surface 426, the heat shield outer surface 410, the centerbody aft face 424, and the forward face 412. The centerbody rim aft face 420 is offset axially downstream of the forward face 412. Together, the shape, the position and the orientation of the centerbody rim aft face 420, the forward face 412, the centerbody rim inner surface 426, and the heat shield outer surface 410 define the downstream end of the cooling air flow gap 422. As the centerbody rim inner surface 426 is radially outside the heat shield outer surface 410, and, as the centerbody rim aft face 420 is aft of the forward face 412, the air 65a flowing through the downstream end of the cooling air flow gap 422 is turned toward the aft direction, and flows at least partially in an axially aft direction.

The air 65a exits the cooling air flow gap 422 at a gap cooling air exit angle 428. The cooling air exit angle 428 may have a non-zero axially aft component. Additionally, the gap cooling air exit angle 428 may have a non-zero radially inward component or a non-zero radially outward component. The gap cooling air exit angle 428 is generally from −45 to 45 degrees. The gap cooling air exit angle 428 may be preferably from −10 to 45 degrees. The gap cooling air exit angle 428 is largely, though not entirely, dependent on the arrangement of the centerbody rim inner surface 426. That is, as the centerbody rim inner surface 426 approaches a cylindrical shape, the gap cooling air exit angle 428 will approach zero, that is, extending in an axially aft direction. The gap cooling air exit angle 428 may additionally be reduced (extending in a more aft direction) by increasing the distance by which the centerbody rim aft face 420 is offset aft of the forward face 412. Conversely, the gap cooling air exit angle 428 may be increased (extending in a more radial direction) by decreasing the distance by which the centerbody rim aft face 420 is offset aft of the forward face 412. Offsetting the centerbody rim aft face 420 forward of the forward face 412 may result in a greater gap cooling air exit angle 428 with respect to the combustor longitudinal centerline axis 94.

Figure 4B:
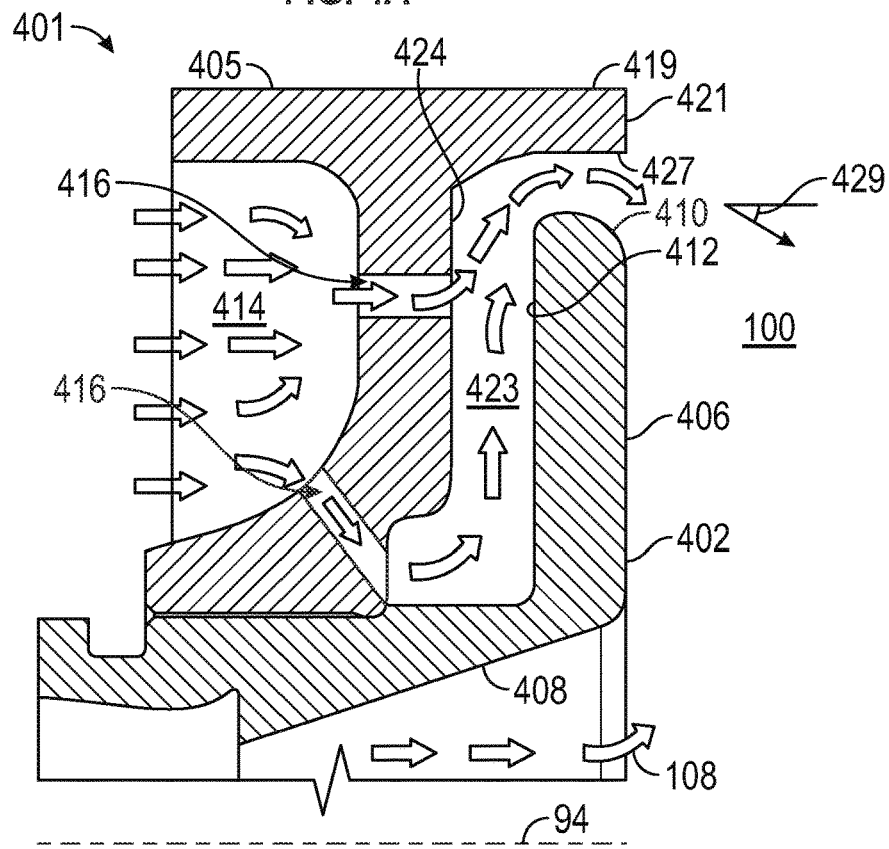
FIG. 4B is a schematic cross-sectional view of a portion of a fuel nozzle-mixer assembly, taken along a combustor longitudinal centerline axis, according to the present disclosure.

FIG. 4B shows an aft portion of a fuel nozzle-mixer assembly 401, similar in configuration to the fuel nozzle-mixer assembly 400 of FIG. 4A, with a configuration that enables a negative gap cooling air exit angle 429. Although the gap cooling air exit angle 428 of FIG. 4A is shown with a non-zero radially outward component, the gap cooling air exit angle 429 may instead have a non-zero radially inward flow component, as shown in FIG. 4B. That is, the flow pattern of the air 65a, upon exiting the cooling air flow gap 422, into the combustion chamber 100 may expand radially outward, as shown in FIG. 4A, or radially inward, as shown in FIG. 4B, with respect to the combustor longitudinal centerline axis 94. Such direction is affected at least in part by the geometry of the heat shield 406 and at least in part by the shape of the centerbody outer shell 404 (FIG. 4A). Both the gap cooling air exit angle 428 (FIG. 4A) and the gap cooling air exit angle 429 (FIG. 4B) have a non-zero axially aft component.

In the fuel nozzle-mixer assembly 401 of FIG. 4B, a centerbody outer shell 405 has a centerbody rim 419 that extends farther aft than the centerbody rim 418 of the centerbody outer shell 404 of the fuel nozzle-mixer assembly 400 of FIG. 4A. In the fuel nozzle-mixer assembly 401, a centerbody rim aft face 421 extends farther aft, such that a cooling air flow gap 423 is angled radially inward, at the negative gap cooling air exit angle 429. The downstream shape of the cooling air flow gap 423 is defined by the heat shield outer surface 410 and a centerbody rim inner surface 427, resulting in the negative gap cooling air exit angle 429. Specifically, the edge effects of the heat shield outer surface 410 and the shape of the centerbody rim 419 may cause at least a portion of the flow of air 65a to turn radially inward, toward the combustor longitudinal centerline axis 94. The same radially inward flow component may similarly exist for any of the additional embodiments in the following descriptions with respect to FIGS. 5A to 6B.

Referring again to FIG. 4A, the combustion gases 66 (FIG. 1) are of an extremely high temperature and can damage components of the fuel nozzle-mixer assembly 400. By having an axial component of the direction of the air 65a exiting the cooling air flow gap 422, the air 65a may not only cool the heat shield 406 at its forward face 412 in the cooling air flow gap 422 by direct heat transfer to the air 65a, but may also displace the hot combustion gases 66 downstream in the combustion chamber 100, increasing the distance between the actual combustion and the fuel nozzle-mixer assembly 400, reducing the temperature at the heat shield 406.

Figure 5A:
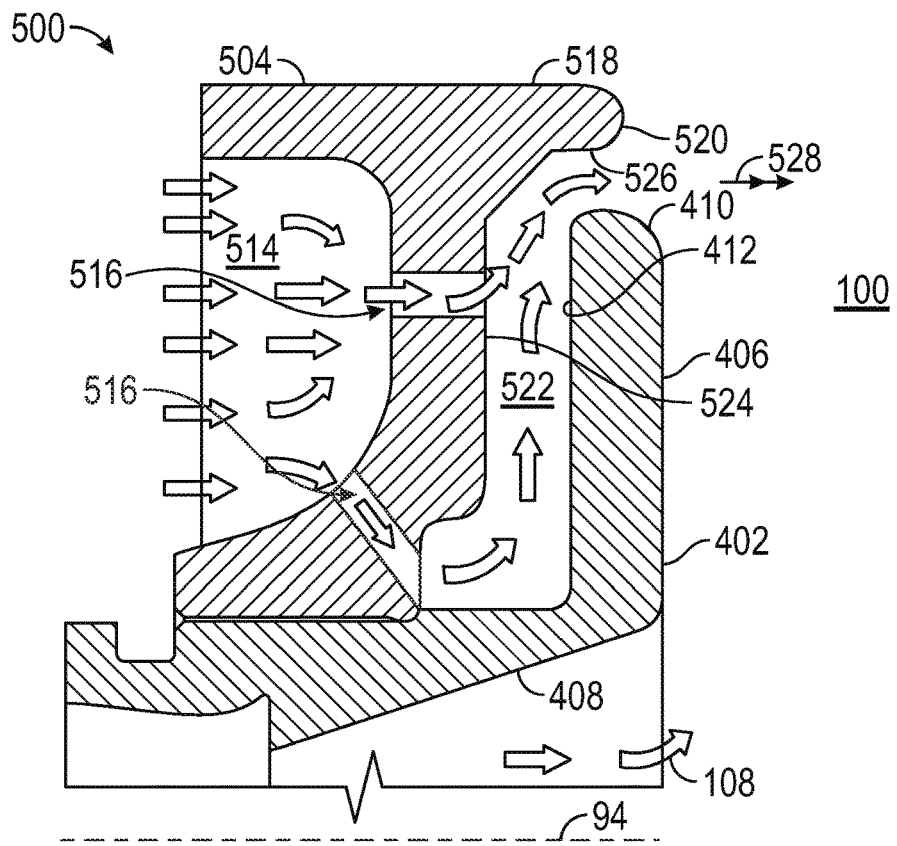
FIG. 5A is a schematic cross-sectional view of a portion of a fuel nozzle-mixer assembly, taken along a combustor longitudinal centerline axis, according to the present disclosure.

Referring now to FIG. 5A, a fuel nozzle-mixer assembly 500 incorporates the venturi body 402 as described with respect to FIGS. 4A and 4B, but with a different centerbody outer shell 504. In comparison with the centerbody outer shell 404 of FIG. 4A and the centerbody outer shell 405 of FIG. 4B, the centerbody outer shell 504 likewise has a cooling air flow cavity 514 that defines a pathway for the air 65a. The air 65a exits the cooling air flow cavity 514 through cooling air exit holes 516 arrayed circularly with respect to the combustor longitudinal centerline axis 94, at the downstream end of the cooling air flow cavity 514, into a cooling air flow gap 522. At the upstream end of the cooling air flow gap 522, the forward face 412 and a centerbody aft face 524 of the centerbody outer shell 504 are generally planar and orthogonal to the combustor longitudinal centerline axis 94, the forward face 412 being disposed aft of the centerbody aft face 524, thereby defining the cooling air flow gap 522. A centerbody rim 518, arranged circumferentially with respect to the combustor longitudinal centerline axis 94, extends from the aft end of the centerbody outer shell 504. In this configuration, the centerbody rim 518 centerbody rim aft face 520 that is rounded, in a bullnose cross-sectional shape.

The centerbody outer shell 504 contains additional features that will further direct the air 65a to flow in an axial direction, thereby displacing the combustion gases 66 and the generated heat aft, away from the heat shield 406. A centerbody rim inner surface 526 of the centerbody rim 518 at the exit of the cooling air flow gap 522 is cylindrical with respect to the combustor longitudinal centerline axis 94. In this way, the air 65a exits the cooling air flow gap 522 at a gap cooling air exit angle 528 with a non-zero axially aft component. As shown in the configuration of the fuel nozzle-mixer assembly 500 of FIG. 5A, the gap cooling air exit angle is substantially parallel to the combustor longitudinal centerline axis, upon exiting the cooling air flow gap 522.

Figure 5B:
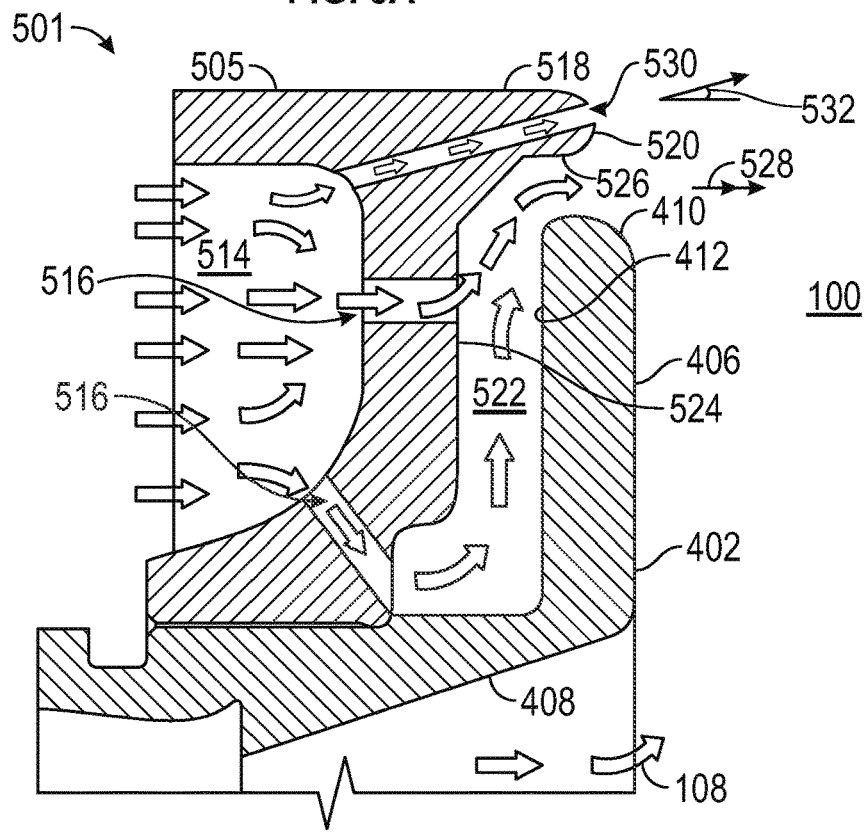
FIG. 5B is a schematic cross-sectional view of a portion of a fuel nozzle-mixer assembly, taken along a combustor longitudinal centerline axis, according to the present disclosure.

Referring now to FIG. 5B, a fuel nozzle-mixer assembly 501 is similar in configuration to the fuel nozzle-mixer assembly 500 as described with respect to FIG. 5A. In the configuration of a centerbody outer shell 505 of the fuel nozzle-mixer assembly 501, however, the air 65a additionally exits the cooling air flow cavity 514 by flowing through a circumferential array of centerbody cooling air exit holes 530. Centerbody cooling air exit holes 530 extend from the cooling air flow cavity 514, in an aft and radially outward direction, through the centerbody rim 518, permitting the air 65a to flow directly into the combustion chamber 100, circumventing the cooling air flow gap 522, and exiting at a centerbody cooling air exit angle 532 with both a non-zero axially aft component and a non-zero radially outward component. The air 65a exiting the cooling air flow cavity 514 via the cooling air flow gap 522 at the gap cooling air exit angle 528 and the air 65a exiting the cooling air flow gap 522 via the centerbody cooling air exit holes 530 at the centerbody cooling air exit angle 532, may be unequal, resulting in a divergence in the air 65a exiting the fuel nozzle-mixer assembly 501, displacing the combustion of the air and fuel aft within the combustion chamber 100, thereby reducing the heat exposure from the combustion process to the heat shield 406.

The centerbody cooling air exit angle 532 may be established by arranging the centerbody cooling air exit holes 530, such that the resultant combination of the air 65a exiting the fuel nozzle-mixer assembly 501 from the cooling air flow gap 522 and the centerbody cooling air exit holes 530 is of a desirable size and shape to properly displace the combustion process aft of the heat shield 406. Similarly, the cooling air exit holes 516 and the centerbody cooling air exit holes 530 may be numbered, and their relative diameters may be sized to achieve a desirable ratio of flows of air 65a through each, and, therefore, a desirable combined volume, distribution, and direction of the air 65a exiting the fuel nozzle-mixer assembly 501.

FIG. 6A shows an additional embodiment of a fuel nozzle-mixer assembly 600, consisting of a venturi body 602 and a centerbody outer shell 604. Similar to the embodiments shown in FIGS. 4A to 5B, the venturi body 602 contains a heat shield 606 for protecting the fuel nozzle from the heat of the combustion process within the combustion chamber 100. The venturi body 602 also contains a venturi 608 for mixing the pilot fuel-oxidizer mixture 108 for combustion in the combustion chamber 100, and the centerbody outer shell 604 defines, at least in part, a cooling air flow cavity 614, through which the air 65a flows, exiting, at least in part, through cooling air exit holes 616, arrayed circularly with respect to the combustor longitudinal centerline axis 94, to displace the combustion process away from the heat shield 606.

In the embodiment of FIG. 6A, multiple features are shown that may represent an improvement of the fuel nozzle-mixer assemblies 400, 401, 500, and 501, shown in FIGS. 4A, 4B, 5A, and 5B, respectively. In the fuel nozzle-mixer assembly 600, a cooling air flow gap 622 is defined, at an upstream end, between a centerbody aft face 624 and a heat shield forward face 612, such that the air 65a flows initially in a radially outward direction in the cooling air flow gap 622. Moving in a downstream flow direction, the cooling air flow gap 622 is then defined by a concave centerbody aft face 626 in the centerbody outer shell 604 and a heat shield rim 636 on a forward end of the heat shield 606. The heat shield rim 636 is arranged generally circumferentially with respect to the combustor longitudinal centerline axis 94 and projects forward from the heat shield 606 and has a heat shield outer surface 610. The heat shield outer surface 610 may be generally cylindrical, as shown in FIG. 6A, or may have any other shape as desired, resulting in a preferable gap cooling air exit angle 628. The gap cooling air exit angle 628 as a non-zero axially aft component. As shown in FIG. 6A, the gap cooling air exit angle is substantially axially aft in direction. A heat shield rim inner surface 638 may be a cylindrical heat shield rim inner surface 638 as shown or may have another shape as may be appropriate for the application, to guide the flow of the air 65a generally forward, after flowing generally radially outward in the area of the centerbody aft face 624 and the heat shield forward face 612. A heat shield rounded forward rim face 640 is present at a forward end of the heat shield rim 636. The arc of the forward heat shield rounded forward rim face 640, when viewed in cross section, is substantially concentric with the arc of the concave centerbody aft face 626, guiding the air 65a radially outward before exiting the cooling air flow gap 622 in an axially aft direction, with a gap cooling air exit angle 628 of zero or near zero.

As may be seen in FIG. 6A, the heat shield rim 636 projects forward, beyond a centerbody rim aft face 620 of the centerbody outer shell 604, which, together, lend an arcuate shape to a downstream portion 634 of the cooling air flow gap 622, and, in turn, the zero or near-zero gap cooling air exit angle 628. The heat shield rim 636 projecting forward, beyond the centerbody rim aft face 620, allows for the zero or near-zero gap cooling air exit angle 628, over a shorter axial distance than an otherwise equivalent fuel nozzle mixer assembly without the forward projecting heat shield rim 636 and corresponding concave centerbody aft face 626, such as that shown in FIGS. 4A to 5B.

An additional feature of the configuration of the fuel nozzle-mixer assembly 600 is a circumferential array of centerbody cooling air exit holes 630, extending aft and radially outward between the cooling air flow cavity 614 and a circular edge of the centerbody outer shell 604 defined by the centerbody rim aft face 620 and a centerbody outer diameter surface 642. Similar to the centerbody cooling air exit holes 530 discussed with respect to FIGS. 5A and 5B, the centerbody cooling air exit holes 630 are arrayed circularly with respect to the combustor longitudinal centerline axis 94 and permit an additional flow path for the air 65a through the cooling air flow cavity 614. A centerbody cooling air exit angle 632 may be established by arranging the centerbody cooling air exit holes 630, such that the resultant combined flow of the air 65a exiting the fuel nozzle-mixer assembly 600 from the cooling air flow gap 622 and the centerbody cooling air exit holes 630 is of a desirable size and shape to properly displace the combustion process aft of the heat shield 606. Additionally, the relative diameters of the cooling air exit holes 616 and the centerbody cooling air exit holes 630 may be sized or numbered to achieve a desirable ratio of flows of the air 65a through each, and, therefore, a desirable distribution and direction of the flow of the air 65a exiting the fuel nozzle-mixer assembly 600. Likewise, the centerbody cooling air exit angle 632 may be arranged in a manner so as to achieve a desirable shape and distribution of the flow of air 65a into the combustion chamber 100, to adequately or more advantageously to displace the combustion process downstream of the heat shield 606. As shown in FIG. 6A, the centerbody cooling air exit angle 632 has a non-zero axially aft component and a non-zero radially outward component. The centerbody cooling air exit angle 632 may be unequal to the gap cooling air exit angle 628.

Referring now to FIG. 6B, a fuel nozzle-mixer assembly 601, similar in configuration to the fuel nozzle-mixer assembly 600 as discussed with respect to FIG. 6A, additionally includes a venturi body 603 with heat shield cooling air exit holes 644, arrayed circularly with respect to the combustor longitudinal centerline axis and extending between the cooling air flow gap 622 and the combustion chamber 100. The heat shield cooling air exit holes 644 provide for the air 65a to flow in an aft and radially outward direction, exiting at a heat shield cooling air exit angle 646. The heat shield cooling air exit angle 646 has a non-zero axially aft component and a non-zero radially outward component. The heat shield cooling air exit angle 646 may be unequal to the gap cooling air exit angle 628 and may be unequal to the centerbody cooling air exit angle 632. Similar to the centerbody cooling air exit holes 630, the presence of the heat shield cooling air exit holes 644 permits a greater total volume of the air 65*a* to flow through the fuel nozzle-mixer assembly 601 via the cooling air flow cavity 614. Also, similarly, the heat shield cooling air exit holes 644 may be sized, and their centerbody cooling air exit angle 632 may be arranged, in consideration of the cooling air flow gap 622, the centerbody cooling air exit holes 630, or both the cooling air flow gap 622 and the centerbody cooling air exit holes 630, such that the resultant combined flow of the air 65*a* exiting the fuel nozzle-mixer assembly 600 from all locations is of a desirable size and shape to properly displace the combustion process aft of the heat shield 606.

The embodiments of the present invention, as described above, and, as shown in FIGS. 4A to 6B, each contains one or more features that may serve to introduce additional flow of the air 65*a* into the combustion chamber 100 at least in part in an axially aft direction with respect to the combustor longitudinal centerline axis 94. Other arrangements are contemplated that include more, fewer, or different combinations of features of the various embodiments described.

Fuel nozzle-mixer assemblies are disposed within a combustor 26 (FIG. 2), and are exposed to the combustion that takes place in the combustion chamber 100 (FIG. 2). As such, fuel nozzle-mixer assemblies are exposed to extreme temperatures produced by the combustion. While heat shields may be applied to protect the fuel nozzle-mixer assemblies from extreme heat, introducing the air 65*a* (FIG. 2) to the combustion chamber 100 flowing at least partially in an aft direction, may serve to displace the combustion aft, and away from the heat shield, reducing the risk of damage from the heat and prolonging the service life of the heat shield. Additional cooling air exit holes from the fuel nozzle heat shield assembly to the combustion chamber 100 increase the volume of the flow of the air 65*a*, and may allow for flexibility in design.

Further aspects are provided by the subject matter of the following clauses.

A combustor of a turbine engine comprises a combustion chamber for combustion of fuel and air, the combustion of the fuel and air generating heat, a fuel nozzle-mixer assembly disposed at a forward end of the combustor for receiving and mixing the fuel and the air, and injecting the fuel and the air into the combustion chamber for combustion, the fuel nozzle-mixer assembly and the combustion chamber generally defining a combustor longitudinal centerline axis, the fuel nozzle-mixer assembly comprising a heat shield disposed at an aft end of the fuel nozzle-mixer assembly for shielding the fuel nozzle-mixer assembly from the heat, and a centerbody outer shell defining in part a cooling air flow cavity for distributing a flow of cooling air through the fuel nozzle-mixer assembly, the centerbody outer shell and the heat shield defining a cooling air flow gap therebetween, and a circular array of cooling air exit holes between the cooling air flow cavity and the cooling air flow gap, the flow of cooling air passing from the cooling air flow cavity through the cooling air exit holes before entering into the cooling air flow gap, and exiting the cooling air flow gap at a gap cooling air exit angle with respect to the combustor longitudinal centerline axis, the gap cooling air exit angle having a non-zero axially aft component, in order to displace the combustion in a downstream direction within the combustion chamber, distancing the heat from the heat shield.

The combustor of the preceding clause, wherein the gap cooling air exit angle has a non-zero radially outward component with respect to the combustor longitudinal centerline axis.

The combustor of any preceding clause, wherein the heat shield comprises a heat shield outer surface arranged substantially cylindrically with respect to the combustor longitudinal centerline axis, and the heat shield outer surface is rounded, in a bullnose cross-sectional shape.

The combustor of any preceding clause, wherein the heat shield comprises a heat shield outer surface arranged substantially cylindrically with respect to the combustor longitudinal centerline axis, and the heat shield outer surface is cylindrical with respect to the combustor longitudinal centerline axis.

The combustor of any preceding clause, wherein the centerbody outer shell further comprises a plurality of centerbody cooling air exit holes arrayed circularly about the combustor longitudinal centerline axis, from the cooling air flow cavity to the combustion chamber at a centerbody cooling air exit angle with respect to the combustor longitudinal centerline axis.

The combustor of the preceding clause, wherein the centerbody cooling air exit angle is not equal to the gap cooling air exit angle.

The combustor of any preceding clause, wherein the heat shield comprises heat shield cooling air exit holes arrayed circularly about the combustor longitudinal centerline axis, from the cooling air flow gap to the combustion chamber at a heat shield cooling air exit angle with respect to the combustor longitudinal centerline axis.

The combustor of the preceding clause, wherein the heat shield cooling air exit angle not equal to the gap cooling air exit angle.

The combustor of any preceding clause, wherein the centerbody outer shell further comprises a centerbody aft face and a centerbody rim projecting from the centerbody outer shell in an axially aft direction and arranged circumferentially about the combustor longitudinal centerline axis, the centerbody rim having a centerbody rim aft face and a centerbody rim inner surface, the heat shield comprises a heat shield forward face arranged substantially orthogonally to the combustor longitudinal centerline axis, and a heat shield outer surface arranged circumferentially with respect to the combustor longitudinal centerline axis, and the cooling air flow gap is further defined by the centerbody aft face, the centerbody rim inner surface, the heat shield forward face, and the heat shield outer surface.

The combustor of the preceding clause, wherein the centerbody rim inner surface is not cylindrical.

The combustor of any preceding clause, wherein the centerbody rim inner surface is cylindrical.

The combustor of any preceding clause, wherein the centerbody rim aft face is rounded, in a bullnose cross-sectional shape.

The combustor of any preceding clause, wherein the centerbody rim aft face is planar, arranged substantially orthogonally to the combustor longitudinal centerline axis.

The combustor of any preceding clause, wherein the heat shield forward face is axially forward of the centerbody rim aft face.

The combustor of any preceding clause, wherein the centerbody rim inner surface is radially outside the heat shield outer surface.

The combustor of any preceding clause, wherein the centerbody outer shell further comprises a circular array of centerbody cooling air exit holes from the cooling air flow cavity, through the centerbody rim, to the combustion chamber at a centerbody cooling air exit angle with respect to the combustor longitudinal centerline axis.

The combustor of the preceding clause, wherein the centerbody cooling air exit angle is not equal to the gap cooling air exit angle.

The combustor of any preceding clause, wherein the heat shield further comprises a heat shield rim projecting axially forward, the heat shield rim having a heat shield rounded forward rim face and a heat shield rim inner surface arranged substantially cylindrically with respect to the combustor longitudinal centerline axis.

The combustor of the preceding clause, wherein the centerbody outer shell further comprises a centerbody aft face, and the heat shield rounded forward rim face is axially forward of the centerbody aft face.

The combustor of the preceding clause, wherein the centerbody aft face comprises a concave centerbody aft face, and the heat shield rounded forward rim face and the concave centerbody aft face are generally concentric when viewed in cross section.

A turbine engine comprising a compressor section that provides a compressed air flow, a fuel system that provides fuel, a combustor located downstream of the compressor section, the combustor comprising: a combustion chamber for combustion of a fuel and air, the combustion of the fuel and air generating combustion gases and generating heat, and a fuel nozzle-mixer assembly disposed at a forward end of the combustor for receiving and mixing the fuel and the air, and injecting the fuel and the air into the combustion chamber for the combustion, the fuel nozzle-mixer assembly and the combustion chamber generally defining a combustor longitudinal centerline axis, the fuel nozzle-mixer assembly comprising: a heat shield disposed at an aft end of the fuel nozzle-mixer assembly for thermally protecting the fuel nozzle-mixer assembly from the heat, and a centerbody outer shell defining in part a cooling air flow cavity for distributing a flow of air through the fuel nozzle-mixer assembly, the centerbody outer shell and the heat shield defining a cooling air flow gap therebetween, the centerbody outer shell comprising a circular array of cooling air exit holes between the cooling air flow cavity and the cooling air flow gap, and a turbine section that is caused to rotate by the combustion gases, wherein the flow of air passes from the cooling air flow cavity through the cooling air exit holes before entering into the cooling air flow gap, and exiting the cooling air flow gap at a gap cooling air exit angle with respect to the combustor longitudinal centerline axis, the gap cooling air exit angle having a non-zero axially aft component, in order to displace the combustion gases in a downstream direction within the combustion chamber, distancing the heat from the heat shield.

The turbine engine of the preceding clause, wherein the gap cooling air exit angle has a non-zero radially outward component or a non-zero radially inward component with respect to the combustor longitudinal centerline axis.

The turbine engine of any preceding clause, wherein the heat shield comprises a heat shield outer surface arranged substantially cylindrically with respect to the combustor longitudinal centerline axis, and the heat shield outer surface is rounded, in a bullnose cross-sectional shape.

The turbine engine of any preceding clause, wherein the heat shield comprises a heat shield outer surface arranged substantially cylindrically with respect to the combustor longitudinal centerline axis, and the heat shield outer surface is cylindrical with respect to the combustor longitudinal centerline axis.

The turbine engine of any preceding clause, wherein the centerbody outer shell further comprises a plurality of centerbody cooling air exit holes arrayed circularly about the combustor longitudinal centerline axis, from the cooling air flow cavity to the combustion chamber at a centerbody cooling air exit angle with respect to the combustor longitudinal centerline axis.

The turbine engine of the preceding clause, wherein the centerbody cooling air exit angle is not equal to the gap cooling air exit angle.

The turbine engine of any preceding clause, wherein the heat shield comprises heat shield cooling air exit holes arrayed circularly about the combustor longitudinal centerline axis, from the cooling air flow gap to the combustion chamber at a heat shield cooling air exit angle with respect to the combustor longitudinal centerline axis.

The turbine engine of the preceding clause, wherein the heat shield cooling air exit angle is not equal to the gap cooling air exit angle.

The turbine engine of any preceding clause, wherein the centerbody outer shell further comprises a centerbody aft face and a centerbody rim projecting from the centerbody outer shell in an axially aft direction and arranged circumferentially about the combustor longitudinal centerline axis, the centerbody rim having a centerbody rim aft face and a centerbody rim inner surface, the heat shield comprises a heat shield forward face arranged substantially orthogonally to the combustor longitudinal centerline axis, and a heat shield outer surface arranged circumferentially with respect to the combustor longitudinal centerline axis, and the cooling air flow gap is further defined by the centerbody aft face, the centerbody rim inner surface, the heat shield forward face, and the heat shield outer surface.

The turbine engine of the preceding clause, wherein the centerbody rim inner surface is not cylindrical.

The turbine engine of any preceding clause, wherein the centerbody rim inner surface is cylindrical.

The turbine engine of any preceding clause, wherein the centerbody rim aft face is rounded, in a bullnose cross-sectional shape.

The turbine engine of any preceding clause, wherein the centerbody rim aft face is planar, arranged substantially orthogonally to the combustor longitudinal centerline axis.

The turbine engine of any preceding clause, wherein the heat shield forward face is axially forward of the centerbody rim aft face.

The turbine engine of any preceding clause, wherein the centerbody rim inner surface is radially outside the heat shield outer surface.

The turbine engine of any preceding clause, wherein the centerbody outer shell further comprises a circular array of centerbody cooling air exit holes from the cooling air flow cavity, through the centerbody rim, to the combustion chamber at a centerbody cooling air exit angle with respect to the combustor longitudinal centerline axis.

The turbine engine of the preceding clause, wherein the centerbody cooling air exit angle is not equal to the gap cooling air exit angle.

The turbine engine of any preceding clause, wherein the heat shield further comprises a heat shield rim projecting axially forward, the heat shield rim having a heat shield rounded forward rim face and a heat shield rim inner surface arranged substantially cylindrically with respect to the combustor longitudinal centerline axis.

The turbine engine of the preceding clause, wherein the centerbody outer shell comprises a centerbody aft face, and the heat shield rounded forward rim face is axially forward of the centerbody aft face.

The turbine engine of the preceding clause, wherein the centerbody aft face comprises a concave centerbody aft face, and the heat shield rounded forward rim face and the concave centerbody aft face are generally concentric when viewed in cross section.

A method of operating a combustor in a turbine engine, the method comprising causing a flow of air to flow through a cooling air flow cavity, defined in part by a centerbody outer shell, causing the flow of air to flow through a circular array of cooling air exit holes from the cooling air flow cavity to a cooling air flow gap defined between the centerbody outer shell and a heat shield, and causing the flow of cooling air to flow through the cooling air flow gap and into a combustion chamber, wherein the flow of cooling air exits the cooling air flow gap at a gap cooling air exit angle with a non-zero axially aft component with respect to a combustor longitudinal centerline axis.

The method of the preceding clause, wherein the gap cooling air exit angle has a non-zero radially outward component with respect to the combustor longitudinal centerline axis.

The method of any preceding clause, wherein the heat shield comprises a heat shield outer surface arranged substantially cylindrically with respect to the combustor longitudinal centerline axis, and the heat shield outer surface is rounded, in a bullnose cross-sectional shape.

The method of any preceding clause, wherein the heat shield comprises a heat shield outer surface arranged substantially cylindrically with respect to the combustor longitudinal centerline axis, and the heat shield outer surface is cylindrical with respect to the combustor longitudinal centerline axis.

The method of any preceding clause, wherein the centerbody outer shell further comprises a plurality of centerbody cooling air exit holes arrayed circularly about the combustor longitudinal centerline axis, from the cooling air flow cavity to the combustion chamber, the method further comprising causing a portion of the flow of air to flow through the centerbody cooling air exit holes to the combustion chamber, exiting the centerbody cooling air exit holes at a centerbody cooling air exit angle with respect to the combustor longitudinal centerline axis.

The method of the preceding clause, wherein the centerbody cooling air exit angle is not equal to the gap cooling air exit angle.

The method of any preceding clause, wherein the heat shield comprises heat shield cooling air exit holes arrayed circularly about the combustor longitudinal centerline axis, from the cooling air flow gap to the combustion chamber, the method further comprising causing a portion of the flow of air to flow through the heat shield cooling air exit holes to the combustion chamber, the portion of the flow of air exiting the heat shield cooling air exit holes at a heat shield cooling air exit angle with respect to the combustor longitudinal centerline axis.

The method of the preceding clause, wherein the heat shield cooling air exit angle is not equal to the gap cooling air exit angle.

The method of any preceding clause, wherein the centerbody outer shell further comprises a centerbody aft face and a centerbody rim projecting from the centerbody outer shell in an axially aft direction and arranged circumferentially about the combustor longitudinal centerline axis, the centerbody rim having a centerbody rim aft face and a centerbody rim inner surface, the heat shield comprises a heat shield forward face arranged substantially orthogonally to the combustor longitudinal centerline axis, and a heat shield outer surface arranged circumferentially with respect to the combustor longitudinal centerline axis, and the cooling air flow gap is further defined by the centerbody aft face, the centerbody rim inner surface, the heat shield forward face, and the heat shield outer surface.

The method of the preceding clause, wherein the centerbody rim inner surface is not cylindrical.

The method of any preceding clause, wherein the centerbody rim inner surface is cylindrical.

The method of any preceding clause, wherein the centerbody rim aft face is rounded, in a bullnose cross-sectional shape.

The method of any preceding clause, wherein the centerbody rim aft face is planar, arranged substantially orthogonally to the combustor longitudinal centerline axis.

The method of any preceding clause, wherein the heat shield forward face is axially forward of the centerbody rim aft face.

The method of any preceding clause, wherein the centerbody rim inner surface is radially outside the heat shield outer surface.

The method of any preceding clause, wherein the centerbody outer shell further comprises a circular array of centerbody cooling air exit holes from the cooling air flow cavity, through the centerbody rim, to the combustion chamber, the method further comprising causing a portion of the flow of air to flow through the centerbody cooling air exit holes to the combustion chamber, the portion of the flow of air exiting the centerbody cooling air exit holes at a centerbody cooling air exit angle with respect to the combustor longitudinal centerline axis.

The method of the preceding clause, wherein the centerbody cooling air exit angle is not equal to the gap cooling air exit angle.

The method of any preceding clause, wherein the heat shield further comprises a heat shield rim projecting axially forward, the heat shield rim having a heat shield rounded forward rim face and a heat shield rim inner surface arranged substantially cylindrically with respect to the combustor longitudinal centerline axis.

The method of the preceding clause, wherein the centerbody outer shell further comprises a centerbody aft face, and the heat shield rounded forward rim face is axially forward of the centerbody aft face.

The method of the preceding clause, wherein the centerbody aft face comprises a concave centerbody aft face, and the heat shield rounded forward rim face and the concave centerbody aft face are generally concentric when viewed in cross section.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A combustor of a turbine engine, the combustor comprising:
   a combustion chamber for combustion of a fuel and air, the combustion of the fuel and air generating combustion gases and generating heat; and a fuel nozzle-mixer assembly disposed at a forward end of the combustor for receiving and mixing the fuel and the air, and injecting the fuel and the air into the combustion chamber for the combustion, the fuel nozzle-mixer assembly and the combustion chamber generally defining a combustor longitudinal centerline axis, the fuel nozzle-mixer assembly comprising:

a heat shield disposed at an aft end of the fuel nozzle-mixer assembly for thermally protecting the fuel nozzle-mixer assembly from the heat; and a centerbody outer shell including a centerbody rim having a centerbody rim inner surface, the centerbody outer shell defining in part a cooling air flow cavity for distributing a flow of air through the fuel nozzle-mixer assembly, the centerbody outer shell and the heat shield defining a cooling air flow gap therebetween, the centerbody outer shell comprising a circular array of cooling air exit holes between the cooling air flow cavity and the cooling air flow gap, wherein the flow of air passes from the cooling air flow cavity through the cooling air exit holes before entering into the cooling air flow gap, and exiting the cooling air flow gap at a gap cooling air exit angle with respect to the combustor longitudinal centerline axis, the gap cooling air exit angle having a non-zero axially aft component, in order to displace the combustion gases in a downstream direction within the combustion chamber, distancing the heat from the heat shield, wherein the heat shield has a rounded heat shield outer surface, and a rounded portion of the rounded heat shield outer surface is at least partially radially in line with the centerbody rim inner surface, and wherein the centerbody rim inner surface is radially outside the rounded heat shield outer surface.

2. The combustor of claim 1, wherein the gap cooling air exit angle has a non-zero radially outward component or a non-zero radially inward component with respect to the combustor longitudinal centerline axis.

3. The combustor of claim 1, wherein the rounded heat shield outer surface is arranged substantially cylindrically with respect to the combustor longitudinal centerline axis and has a bullnose cross-sectional shape.

4. The combustor of claim 1, wherein the rounded heat shield outer surface is arranged substantially cylindrically with respect to the combustor longitudinal centerline axis and is cylindrical with respect to the combustor longitudinal centerline axis.

5. The combustor of claim 1, wherein the centerbody outer shell further comprises a plurality of centerbody cooling air exit holes arrayed circularly about the combustor longitudinal centerline axis, from the cooling air flow cavity to the combustion chamber at a centerbody cooling air exit angle with respect to the combustor longitudinal centerline axis.

6. The combustor of claim 5, wherein the centerbody cooling air exit angle is not equal to the gap cooling air exit angle.

7. The combustor of claim 1, wherein the heat shield comprises heat shield cooling air exit holes arrayed circularly about the combustor longitudinal centerline axis, from the cooling air flow gap to the combustion chamber at a heat shield cooling air exit angle with respect to the combustor longitudinal centerline axis.

8. The combustor of claim 7, wherein the heat shield cooling air exit angle is not equal to the gap cooling air exit angle.

9. The combustor of claim 1, wherein the centerbody outer shell further comprises a centerbody aft face, the centerbody rim projects from the centerbody outer shell in an axially aft direction and is arranged circumferentially about the combustor longitudinal centerline axis, the centerbody rim having a centerbody rim aft face, the heat shield comprises a heat shield forward face arranged substantially orthogonally to the combustor longitudinal centerline axis, the rounded heat shield outer surface is arranged circumferentially with respect to the combustor longitudinal centerline axis, and the cooling air flow gap is further defined by the centerbody aft face, the centerbody rim inner surface, the heat shield forward face, and the rounded heat shield outer surface.

10. The combustor of claim 9, wherein the centerbody rim inner surface is not cylindrical.

11. The combustor of claim 9, wherein the centerbody rim inner surface is cylindrical.

12. The combustor of claim 9, wherein the centerbody rim aft face is rounded, in a bullnose cross-sectional shape, or is planar, arranged substantially orthogonally to the combustor longitudinal centerline axis.

13. The combustor of claim 9, wherein the heat shield forward face is axially forward of the centerbody rim aft face.

14. The combustor of claim 9, wherein the centerbody outer shell further comprises a circular array of centerbody cooling air exit holes from the cooling air flow cavity, through the centerbody rim, to the combustion chamber at a centerbody cooling air exit angle with respect to the combustor longitudinal centerline axis.

15. The combustor of claim 14, wherein the centerbody cooling air exit angle is not equal to the gap cooling air exit angle.

16. The combustor of claim 1, wherein the heat shield further comprises a heat shield rim projecting axially forward, the heat shield rim having a heat shield rounded forward rim face and a heat shield rim inner surface arranged substantially cylindrically with respect to the combustor longitudinal centerline axis.

17. The combustor of claim 16, wherein the centerbody outer shell comprises a centerbody aft face, and the heat shield rounded forward rim face is axially forward of the centerbody aft face.

18. The combustor of claim 17, wherein the centerbody aft face comprises a concave centerbody aft face, and the heat shield rounded forward rim face and the concave centerbody aft face are generally concentric when viewed in cross section.

19. A turbine engine comprising:
a compressor section that provides a compressed air flow;
a fuel system that provides fuel;
a combustor located downstream of the compressor section, the combustor comprising:
a combustion chamber for combustion of a fuel and air, the combustion of the fuel and air generating combustion gases and generating heat; and
a fuel nozzle-mixer assembly disposed at a forward end of the combustor for receiving and mixing the fuel and the air, and injecting the fuel and the air into the combustion chamber for the combustion, the fuel nozzle-mixer assembly and the combustion chamber generally defining a combustor longitudinal centerline axis, the fuel nozzle-mixer assembly comprising:

a heat shield disposed at an aft end of the fuel nozzle-mixer assembly for thermally protecting the fuel nozzle-mixer assembly from the heat; and a centerbody outer shell including a centerbody rim having a centerbody rim inner surface, the centerbody outer shell defining in part a cooling air flow cavity for distributing a flow of air through the fuel nozzle-mixer assembly, the centerbody outer shell and the heat shield defining a cooling air flow gap therebetween, the centerbody outer shell comprising a circular array of cooling air exit holes between the cooling air flow cavity and the cooling air flow gap; and a turbine section that is caused to rotate by the combustion gases, wherein the flow of air passes from the cooling air flow cavity through the cooling air exit holes before entering into the cooling air flow gap, and exiting the cooling air flow gap at a gap cooling air exit angle with respect to the combustor longitudinal centerline axis, the gap cooling air exit angle having a non-zero axially aft component, in order to displace the combustion gases in a downstream direction within the combustion chamber, distancing the heat from the heat shield, wherein the heat shield has a rounded heat shield outer surface, and a rounded portion of the rounded heat shield outer surface is at least partially radially in line with the centerbody rim inner surface, and wherein the centerbody rim inner surface is radially outside the rounded heat shield outer surface.

\* \* \* \* \*